US012342138B2

(12) United States Patent
Lee et al.

(10) Patent No.: US 12,342,138 B2
(45) Date of Patent: Jun. 24, 2025

(54) TRANSDUCER APPARATUS: POSITIONING AND HIGH SIGNAL-TO-NOISE-RATIO MICROPHONES

(71) Applicants: AUDIO ZOOM PTE LTD, Singapore (SG); Chai Lung Lee, Singapore (SG)

(72) Inventors: Chai Lung Lee, Singapore (SG); Joseph Sylvester Chang, Singapore (SG); Yin Sun, Singapore (SG); Tong Ge, Singapore (SG); Sebastian MingJie Chang, Canberra (AU)

(73) Assignees: Chai Lung Lee, Singapore (SG); AUDIO ZOOM PTE LTD, Singapore (SG)

( * ) Notice: Subject to any disclaimer, the term of this patent is extended or adjusted under 35 U.S.C. 154(b) by 196 days.

(21) Appl. No.: 17/764,144

(22) PCT Filed: Sep. 26, 2020

(86) PCT No.: PCT/SG2020/050547
§ 371 (c)(1),
(2) Date: Mar. 25, 2022

(87) PCT Pub. No.: WO2021/061055
PCT Pub. Date: Apr. 1, 2021

(65) Prior Publication Data

US 2022/0345814 A1 Oct. 27, 2022

(30) Foreign Application Priority Data

Sep. 26, 2019 (SG) ............................ 10201908995P
Dec. 23, 2019 (SG) ........................... 10201912951V

(51) Int. Cl.
*H04R 3/00* (2006.01)
*H04R 1/02* (2006.01)
(Continued)

(52) U.S. Cl.
CPC ............. *H04R 3/005* (2013.01); *H04R 1/028* (2013.01); *H04R 1/406* (2013.01); *H04R 1/46* (2013.01);
(Continued)

(58) Field of Classification Search
CPC ........ H04R 3/005; H04R 1/028; H04R 1/406; H04R 1/46; H04R 2410/01; H04R 2499/11
(Continued)

(56) References Cited

U.S. PATENT DOCUMENTS 9,661,411 B1 5/2017 Han et al.
2006/0083390 A1 4/2006 Kaderavek et al.
(Continued)

FOREIGN PATENT DOCUMENTS

EP 3035702 A1 6/2016
WO 2021061055 A1 4/2021

OTHER PUBLICATIONS

Leo Beranek and Tim Mellow, “Acoustics: Sound Fields, Transducers and Vibration”, Academic Press (2019), ISBN-13: 978-0128152270.
(Continued)

*Primary Examiner* — Thjuan K Addy
(74) *Attorney, Agent, or Firm* — Conley Rose, P.C.

(57) ABSTRACT

The invention generally relates a transducer apparatus in a device to obtain high signal-to-noise-ratio signals including speech in a noisy environment by a non-acoustic transducer or sensor adapted in two ways. One, adapted to sense free-field acoustical sounds and whose sensitivity is directive, and arranged to be most sensitive to a direction or axis according to the position or orientation of the device. Two, adapted to sense vibrations, movement or acceleration on the skin of the user of the device arising from the voice of
(Continued)

the user. Embodiments and variations of the invention include where the two adaptions are combined, and with acoustical microphones. In the case of adaption two and with a microphone, a transducer apparatus resembling the characteristics of a close-talking microphone can be derived.

20 Claims, 9 Drawing Sheets

(51) Int. Cl.
*H04R 1/40* (2006.01)
*H04R 1/46* (2006.01)

(52) U.S. Cl.
CPC ...... *H04R 2410/01* (2013.01); *H04R 2499/11* (2013.01)

(58) Field of Classification Search
USPC .................................... 381/92, 91, 111, 122
See application file for complete search history.

(56) References Cited

U.S. PATENT DOCUMENTS

| | | | | |
|---|---|---|---|---|
| 2008/0037803 | A1* | 2/2008 | Breed | H04R 5/02 381/86 |
| 2010/0026780 | A1 | 2/2010 | Tico et al. | |
| 2013/0125326 | A1* | 5/2013 | Schmid | A61C 17/221 15/105 |
| 2014/0364171 | A1 | 12/2014 | Heiman et al. | |
| 2017/0125032 | A1 | 5/2017 | Sorensen | |

OTHER PUBLICATIONS

Knowles Electronics, NR Series Microphones, 2017: https://www.knowles.com/docs/default-source/default-document-library/an-18-issue00.pdf?sfvrsn=6.

Foreign Communication from a Related Counterpart Application, International Search Report and Written Opinion dated Jan. 29, 2021, International Application No. PCT/SG2020/050547 filed on Sep. 26, 2020.

* cited by examiner

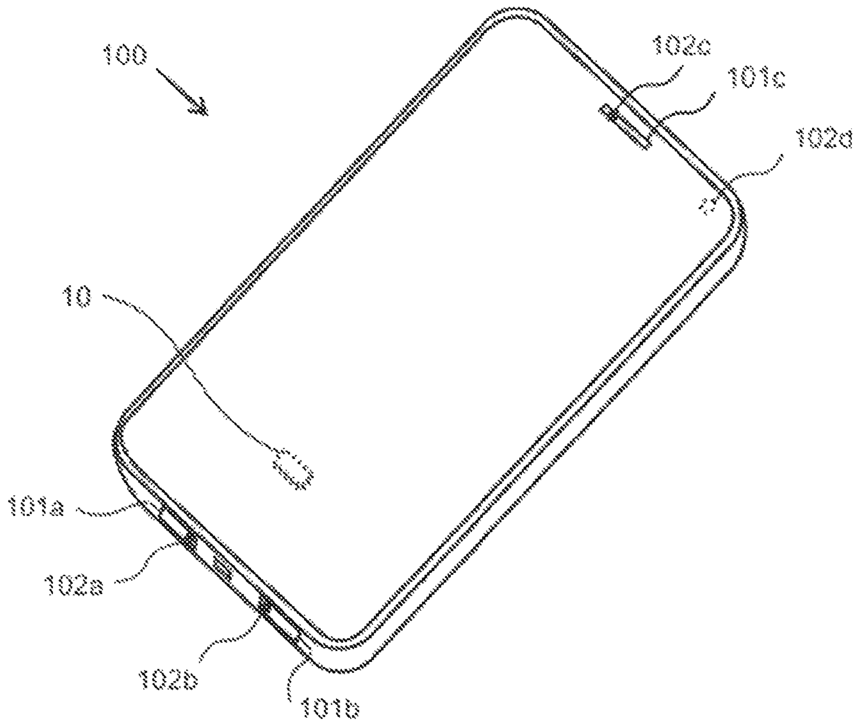
Fig. 1 (Prior-Art)
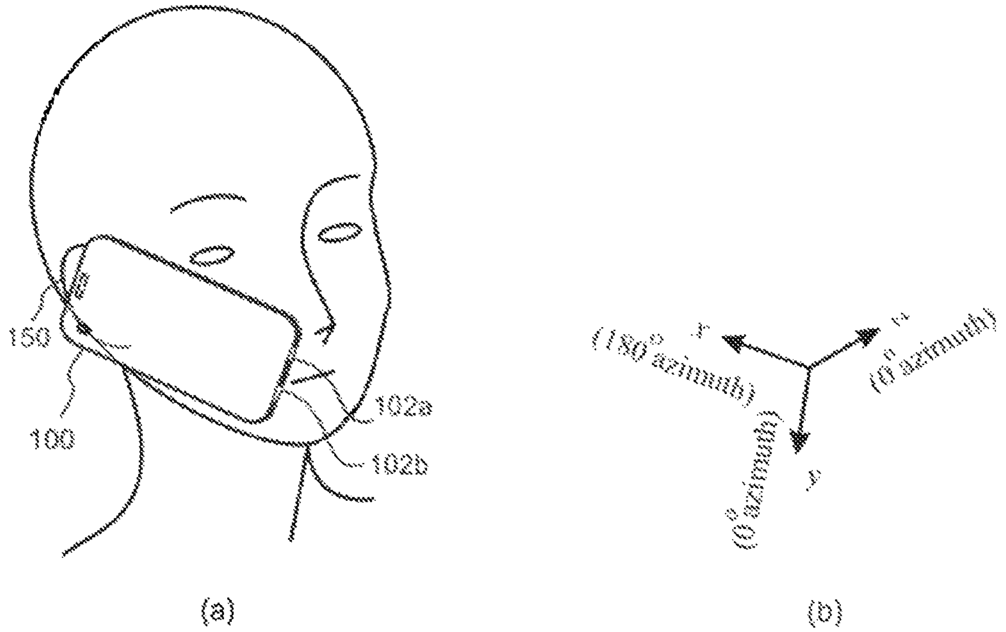
Fig. 2 (Prior-Art)

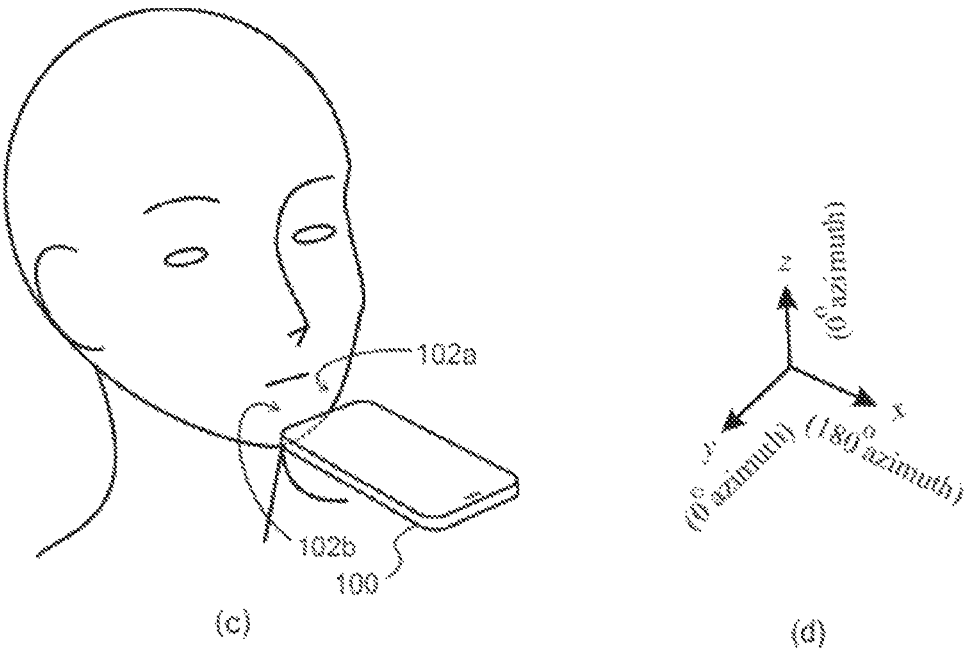
Fig. 2 (Prior-Art)
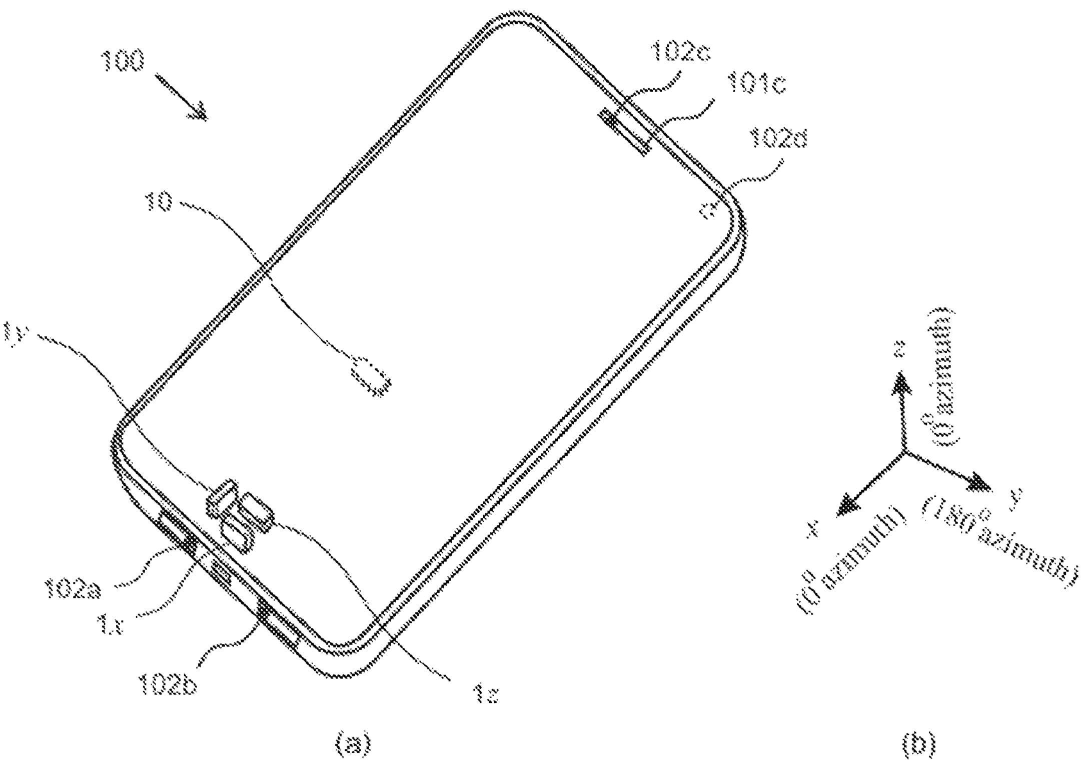
Fig. 3

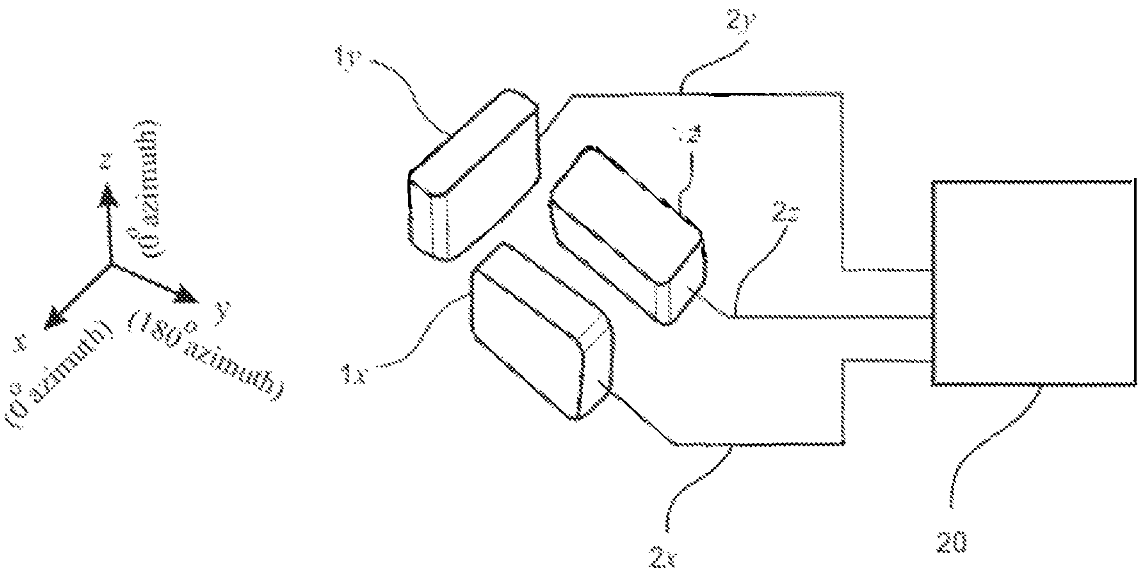
(a)
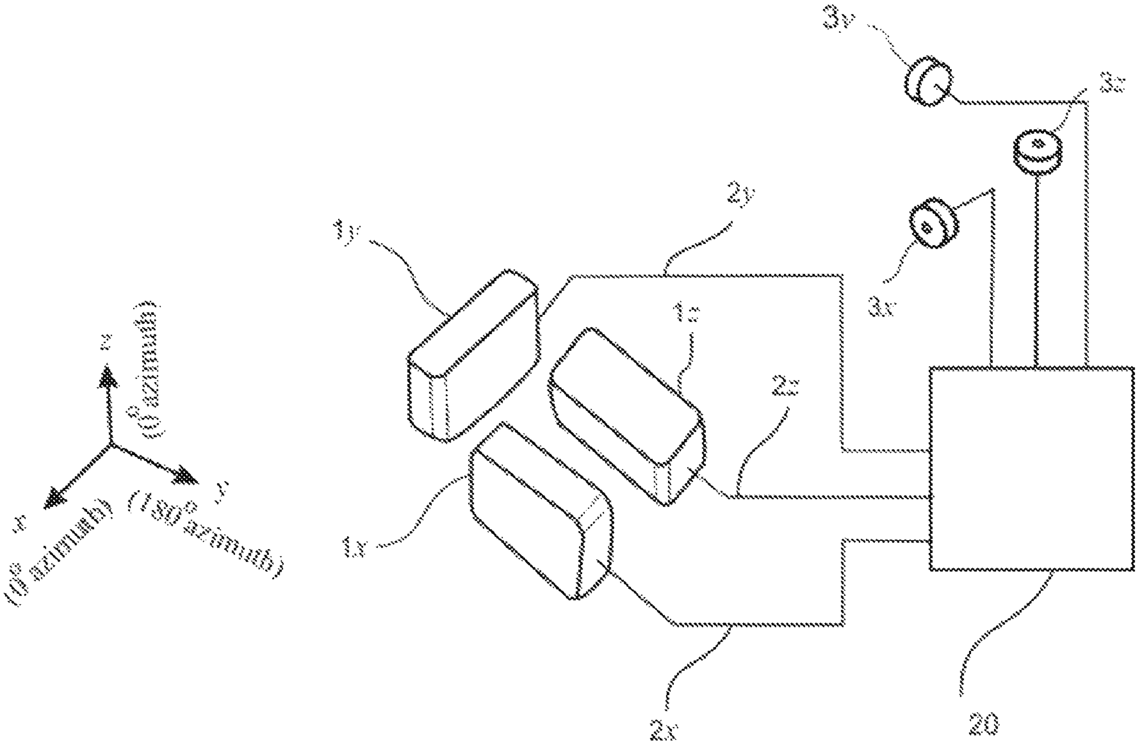
(b)
Fig. 5

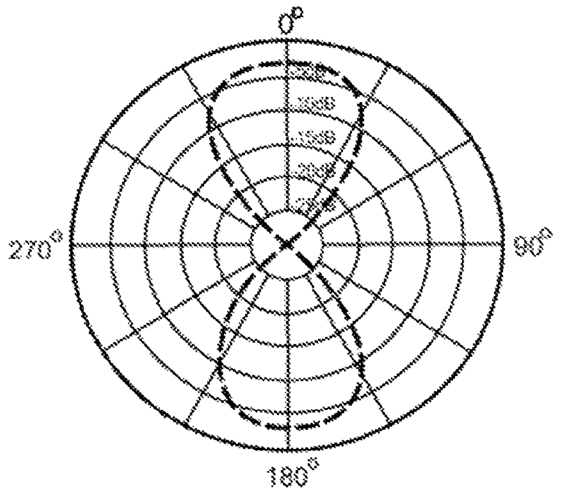
(a)
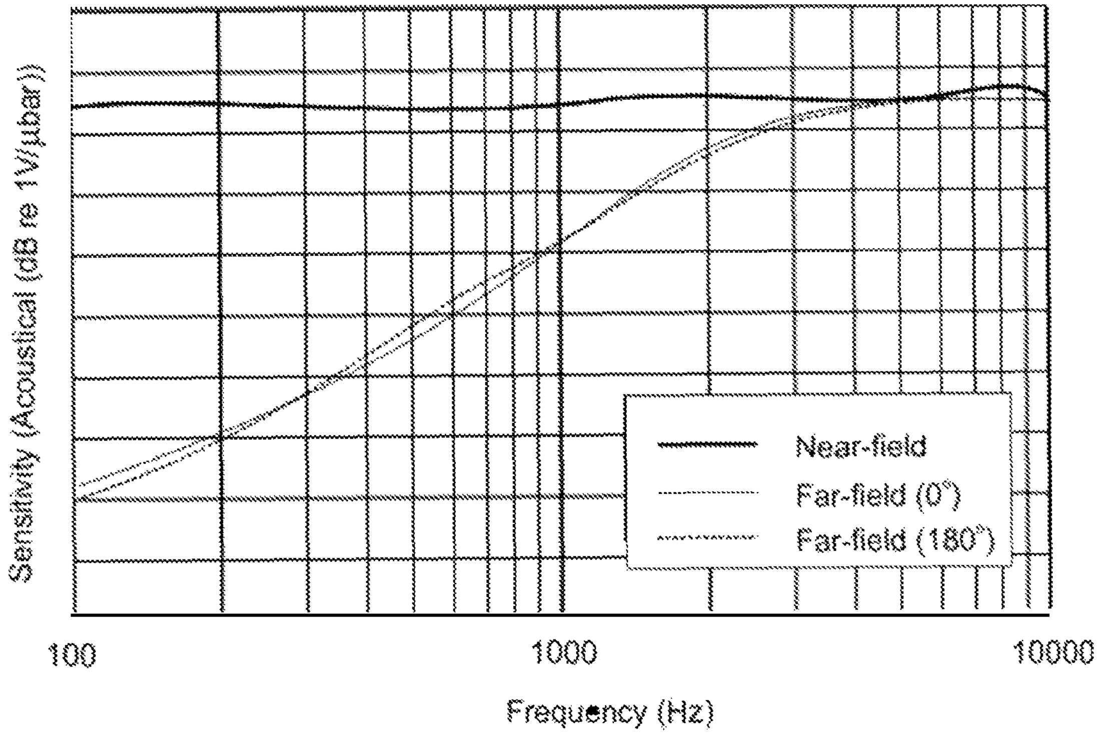
(b)
Fig. 6 (Prior-Art)

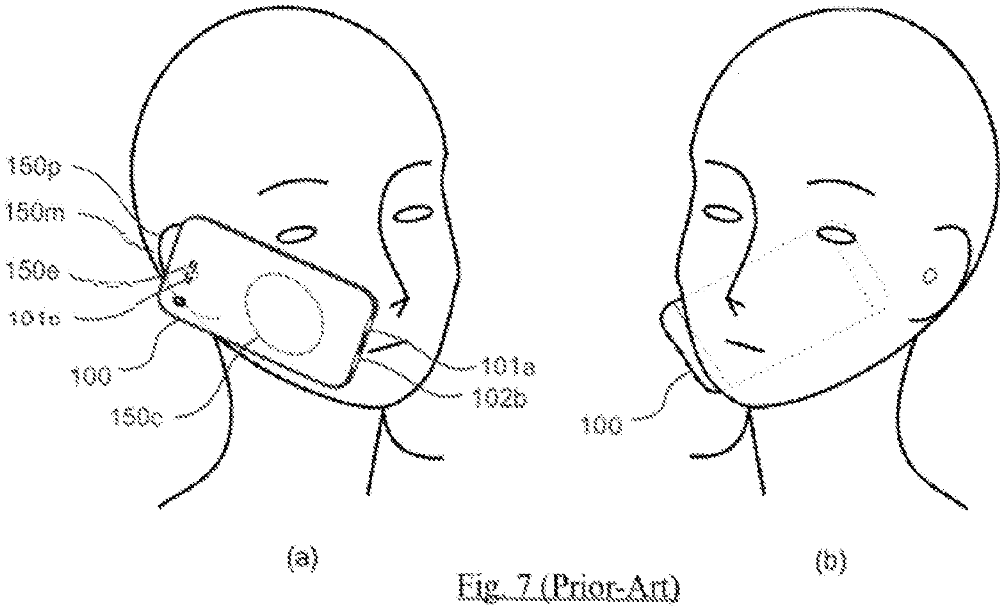
Fig. 7 (Prior-Art)
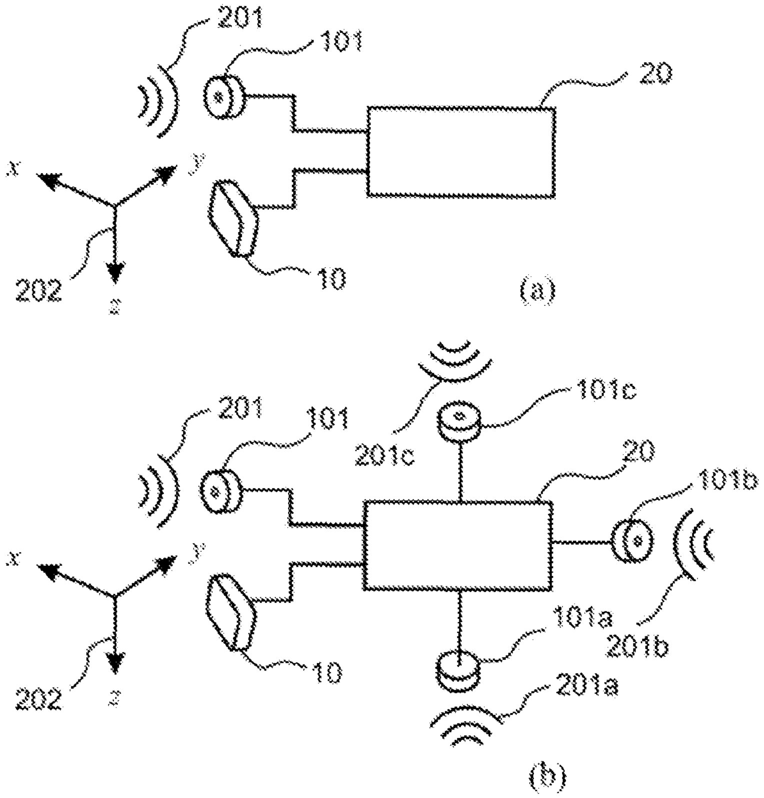
Fig. 8 (prior-art)

(a)

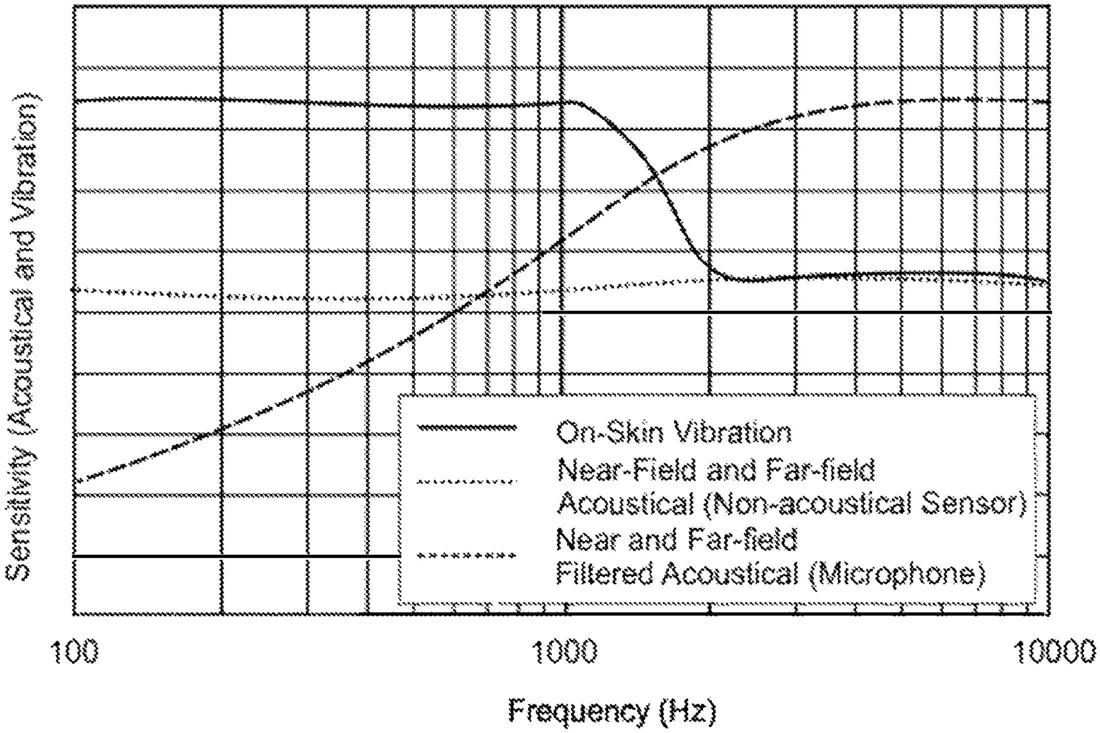
(b)
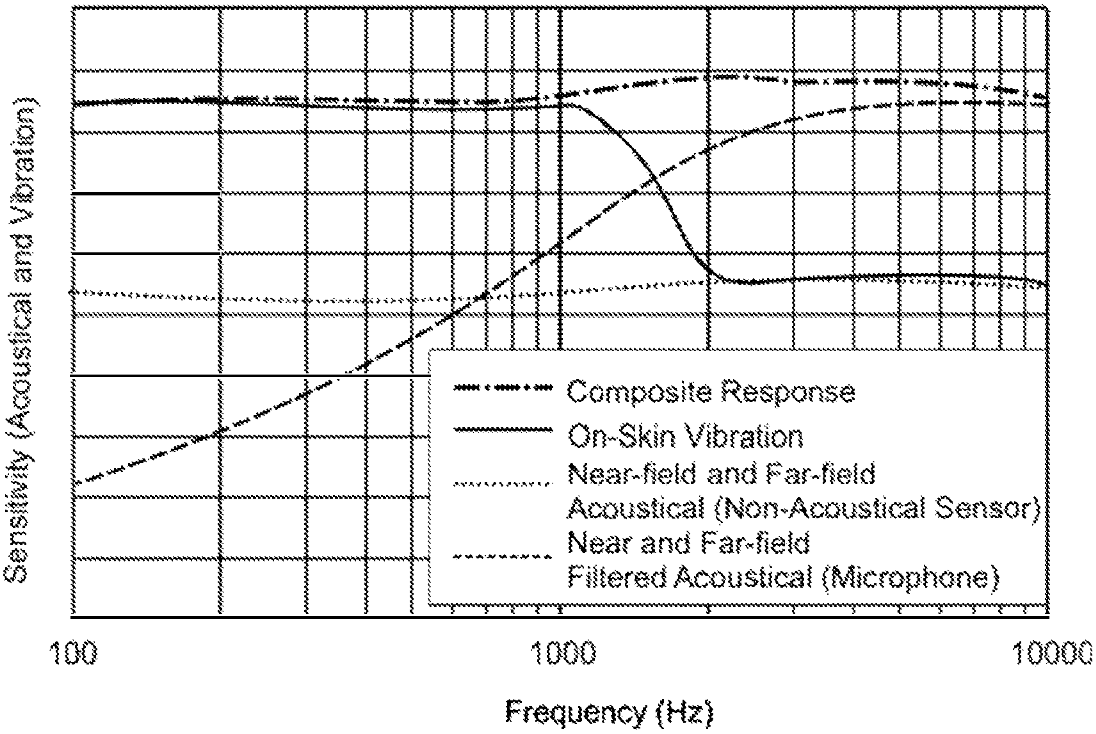
(c)
Fig. 10

TRANSDUCER APPARATUS: POSITIONING AND HIGH SIGNAL-TO-NOISE-RATIO MICROPHONES

PRIORITY CLAIM

The present application claims priority to SG Provisional Applications No. 10201908995P filed on 26 Sep. 2019 and 10201912951V filed on 23 Dec. 2019.

TECHNICAL FIELD

Embodiments of the invention generally relate a transducer apparatus in a device to obtain high signal-to-noise-ratio acoustical or equivalent-acoustical sounds including speech in a noisy environment by:

(i) Enabling or sampling the output of one or a multiplicity of transducers or sensors to sense acoustical sounds according to the orientation or position of a device embodying the said one or multiplicity of transducers or sensors, and (ii) Arrangements for sensing acoustical sounds with a non-acoustical transducer(s) or sensor(s) and/or with a microphone to obtain a high signal-to-noise-ratio signal, that resembling a pressure-gradient or close-talking microphone.

BACKGROUND ART

Obtaining a desired signal with high signal-to-noise ratio in a noisy environment is often challenging [1]. The desired signal includes a human speaker's voice. The undesired noise includes speech from other people and other noise sources in the vicinity of the said human speaker, etc.

The prior-art means to obtain high signal-to-noise speech include one or a multiplicity of acoustical microphones with high directivity, close-talking response, etc., and with signal processing by processing the output of the one or a multiplicity of microphones. Such signal processing means include beamforming, noise reduction algorithms, etc. In the case of a multiplicity of acoustical microphones in an electronic device (e.g., smartphone), these microphones are often placed at different parts of the electronic device. The signal processing means includes computing the output of each microphone to ascertain which microphone (of the multiplicity of microphones) provides the highest signal-to-noise ratio signal, and using that signal more intensely than that from other microphones.

Note that the prior-art does not include the orientation or position of the electronic device to provide additional information to obtain higher signal-to-noise ratio signals but instead from the signal processing on the outputs of the different microphones.

In the case of close-talking microphones, the basic principle of prior-art directional and close-talking microphones is the pressure difference between the two ports of the acoustical microphone [1]. Their ensuing polar response features high directivity, e.g., a figure-8 polar response—see FIG. 6(*a*) later. By acoustical mechanisms, the magnitude frequency response of the close-talking microphone to near-field sounds (i.e., the user's voice when the microphone is placed near the user's mouth) is nearly flat while far-field sounds (at 0° and 180° azimuths) are effectively high pass filtered—see FIG. 6(*b*) later. An example prior-art close-talking microphone is the Knowles NR series microphone [2]. Note that the mechanism of the prior-art means is solely by acoustics (and not by other means), and the noise immunity provided is insufficient in many situations.

In short, there is a need for new transducer and/or microphone apparatus to obtain higher noise immunity (either acoustically by new novel means or perceived psycho-acoustically) in noisy places, including for smartphones and other electronic devices.

SUMMARY OF INVENTION

Generally, the invention pertains to a transducer apparatus (in a device) that obtains high signal-to-noise signals in quiet and noisy acoustical environments, and there are three embodiments.

The first embodiment of the invention pertains to a transducer apparatus whose transducer(s) or sensor(s) is arranged to be selected based on the position or orientation of the device embodying the transducer apparatus or on signal processing using the outputs of the transducers or sensors in the invented transducer apparatus. The transducer apparatus obtains high signal-to-noise-ratio signals, i.e., high noise immunity, because the transducer(s) or sensor(s) that is most sensitive in the direction to the user's mouth is selected and noise in other directions are rejected and/or used for noise reduction algorithms. The transducer or sensor is a non-acoustical transducer or sensor but adapted to sense free-field sounds, and is highly directive.

The second embodiment of the invention pertains to a transducer apparatus to obtain a high-signal-noise signals using a non-acoustical transducer or sensor adapted to sense vibrations, movement or acceleration on the skin of the user's head due the user's voice. A response resembling a close-talking microphone can be derived.

The third embodiment of the invention is a combination of the first and second embodiments of the invention.

In the first embodiment, the device having a means to ascertain its position or orientation and embodying the transducer apparatus that may also provide a means to ascertain the position or orientation of the device. The invented transducer apparatus comprises at least a transducer or sensor that is sensitive to vibrations, movement or acceleration. The transducer or sensor is however adapted to sense free-field acoustical sounds and is usually highly directive in one direction or along one axis. Depending on the orientation or position of the device, the transducer or sensor is adapted to be most sensitive to one direction or along one axis, usually to the mouth of the user of the device.

In the first variation of the first embodiment, the transducer apparatus further comprises a second transducer or sensor such that is arranged such that its most sensitive direction or axis is different from that of the first transducer or sensor in the first embodiment. In most cases, the most sensitive direction or axis of the second transducer or sensor is arranged to be perpendicular to that of the first transducer or sensor.

In the second variation of the first embodiment, the transducer further comprises a third transducer or sensor and all transducers or sensors are arranged such that the most sensitive direction or axis are of all three transducers or sensors is perpendicular to every other transducer or sensor. For example, each transducer or sensor is arranged to be placed along one-axis of the three-axes of space.

In the third variation of the first embodiment, the transducer apparatus in the first embodiment, first variation and second variation comprise two or more transducers or sensors (instead of one transducer or sensor) that are arranged in each of the respective most sensitive direction or axis, i.e., placed in parallel. This is to facilitate further directivity by means of signal processing, e.g., beamforming.

The second embodiment of the invention is a transducer apparatus, as in the first embodiment of the invention, comprises a non-acoustical transducer or sensor such as an accelerometer, shock sensor, gyroscope, vibration microphone, or vibration sensor. However, in this second embodiment, the transducer or sensor is arranged to sense vibrations, movement or acceleration on the skin of the user's face arising from the voice of the user, instead of being adapted to sense free-field acoustical sounds. The transducer or sensor may already be available in electronic devices, such as a smartphone, tablet, etc., or an independent transducer or sensor may be used. The transducer or sensor can be of various characteristics, including one that features higher sensitivity to low frequency vibrations, movement or acceleration than to higher frequencies, and/or feature higher sensitivity vibrations, movement or acceleration on the skin than to free-field vibrations, movement or acceleration.

The first variation of the second embodiment of the invention includes the employment of an acoustical microphone whose magnitude frequency response can be of various characteristics, e.g., high-pass filtered. By an arrangement involving the summing of the microphone(s) of various characteristics with the output of the non-acoustical sensor, a microphone equivalents of novel responses can be obtained. For example, if the microphone features a high-pass magnitude frequency response, the invented transducer apparatus is:

(i) Sensitive to very near 'free-field' sounds in the low frequency range by sensing vibrations, movement or acceleration on the skin of the user's face arising from the voice of the user, (ii) Insensitive to near and far free-field sounds in the low frequency range, and (iii) Sensitive to far free-field sounds in the high frequency range The second variation of the second embodiment of the invention is a transducer apparatus involving various signal processing. One processing involves the output of the non-acoustical sensor to provide voice activation (VOX) which may be applied to provide a psycho-acoustical perception of higher signal-to-noise ratio. Another processing involves obtaining a reverse-type Automatic-Gain-Control which may be applied to provide a psycho-acoustical perception of higher signal-to-noise ratio.

The third embodiment of the invention is a combination of the first and second embodiments of the invention.

This summary does not describe an exhaustive list of all aspects of the present invention. It is anticipated that the present invention includes all methods, apparatus and systems that can be practiced from all appropriate combinations and permutations of the various aspects in this summary, as well as that delineated below. Such combinations and permutations may have specific advantages not specially described in this summary.

BRIEF DESCRIPTION OF DRAWINGS

The embodiments of the invention are illustrated by way of example and not by way of limitation in the figures of the accompanying drawings in which like references indicate similar elements. It should be noted that references to "an" or "one" embodiment of the invention herein are not necessarily to the same embodiment, and they mean at least one.

FIG. 1 (prior-art) depicts a contemporary prior-art electronic device—the example is a smartphone.

FIG. 2 (prior-art) depicts how the smartphone is commonly used. In FIG. 2(*a*), the smartphone is used in the usual fashion and its spatial orientation is referenced in FIG. 2(*b*). In FIG. 2(*c*), the smartphone is used as a speakerphone, and its orientation is referenced to FIG. 2(*d*).

FIG. 3(*a*) depicts the first embodiment of the invention where the smartphone embodies an array of transducers or sensors—from one to three transducers or sensors—where the transducer or sensor may be an accelerometer, shock sensor, gyroscope, vibration microphone, or vibration sensor. Although three transducers or sensors are depicted here, in most cases, an array of two transducers or sensors is sufficient. The orientation is referenced to FIG. 3(*b*).

FIG. 4(*c*) depicts the preferred directivity (polar) plot of the two transducers or sensors in the x- and z-axes. FIG. 4(*d*) depicts the further preferred directivity (polar) plot of the same when one side of the transducer or sensor is blocked.

FIG. 5(*a*) depicts the same array of three transducers or sensors earlier depicted in FIG. 3(*a*) where the output of each transducer or sensor is connected to a signal processor. FIG. 5(*b*) depicts the same as FIG. 5(*a*), with three acoustical microphones oriented towards the three axes.

FIGS. 6(*a*) and 6(*b*) (prior-art) depict the directivity polar plot and magnitude frequency response of a prior-art close-talking microphone, respectively.

FIGS. 7(*a*) and 7(*b*) (prior-art) depict how a smartphone is usually used viewed from the right side and left side of the user's head, respectively.

FIG. 8(*a*) (prior-art) depicts the functional diagram of a prior-art transducer apparatus in a device, comprising at least a single microphone and a non-acoustical transducer or sensor that senses movement/orientation of the device, and are connected to a signal processor in the device. FIG. 8(*b*) depicts the same but further with a multiplicity of microphones.

FIG. 9(*b*) depicts the same but with a multiplicity of microphones.

FIG. 10(*b*) depicts the same as in FIG. 10(*c*) but with the augmentation of the magnitude frequency response of the microphone where it is adapted to feature high-pass characteristics.

FIG. 10(*c*) depicts the same as in FIG. 10(*b*) but with the augmentation of the composite magnitude frequency response of the transducer or sensor and the microphone. The composite magnitude frequency response is approximately flat throughout the spectrum and resembles a close-talking microphone. Of interest, in this example, in the low frequency, the user's voice is largely picked up by the transducer or sensor, and near and far free-field sounds are largely unsensed; and in the high-frequency range, near and far free-field sounds are sensed by the microphone.

DESCRIPTION OF EMBODIMENTS

Figure 4:
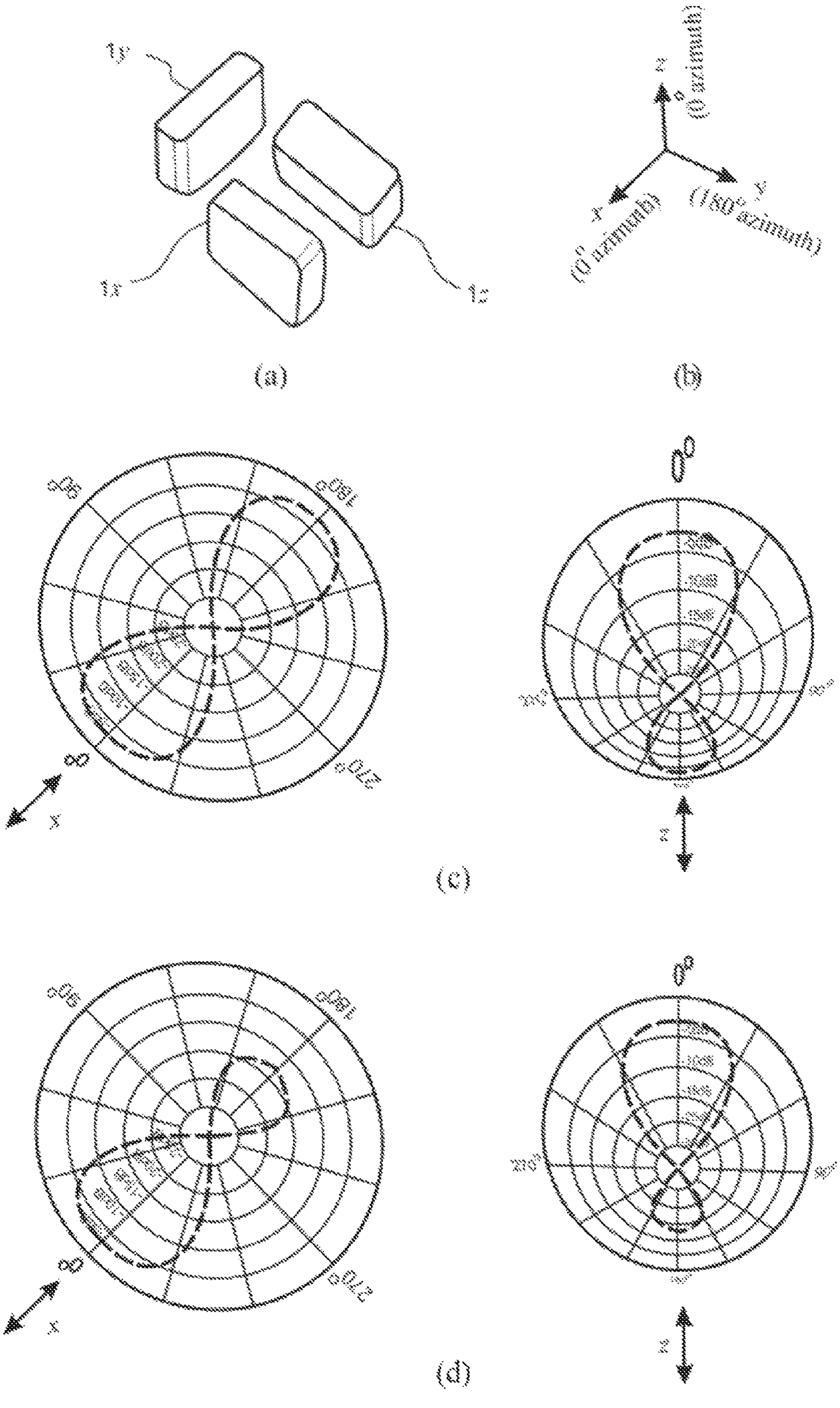
FIG. 4(*a*) depicts the same array of three transducers or sensors earlier depicted in FIG. 3(*a*) but without the smartphone, and the orientation is referenced to FIG. 4(*b*).

Numerous specific details are set forth in the following descriptions. It is however understood that embodiments of the invention may be practiced with or without these specific details. In other instances, circuits, structures, methods and techniques that are known do not avoid obscuring the understanding of this description. Furthermore, the following embodiments of the invention may be described as a process, which may be described as a flowchart, a flow diagram, a structure diagram, or a block diagram. The operations in the flowchart, flow diagram, structure diagram or block diagram may be a sequential process, parallel or concurrent process, and the order of the operations may be re-arranged. A process may correspond to a technique, methodology, procedure, etc.

FIG. 1 depicts the front surface (display surface) perspective view of an electronic device, Smartphone 100. Smartphone 100 typically comprises a multiplicity of microphones—Left Bottom Microphone 102*a* in Left Bottom Cavity 101*a*, Right Bottom Microphone 102*b* in Right Bottom Cavity 101*b*, Microphone 102*c* in EarSpeaker Cavity 101*c* on front surface of Smartphone 100, and Microphone 102*d* on the back surface of Smartphone 100. Smartphone 100 also embodies Position/Orientation Transducer or Sensor 10, typically a 3—or more axes gyroscope to ascertain the position/orientation of Smartphone 100.

FIG. 2(*a*) depicts Smartphone 100 being used in the usual fashion. In this modality, Smartphone 100 is largely oriented in landscape such that the front surface (display surface) of Smartphone 100 is placed on (or approximately in parallel to and facing) the cheek (or side face) of the user. In this case, EarSpeaker Cavity 101*c* is placed over Pinna 150 of the user. Either Left Bottom Microphone 102*a* or Right Bottom Microphone 102*b* or both sense the speech of the user.

FIG. 2(*b*) depicts the defined 3-dimensional spatial orientation of Smartphone 100. The x-axis is parallel to the front surface (display) or back surface along the top-bottom length of Smartphone 100. The y-axis is parallel to the top and bottom surfaces of Smartphone 100. The z-axis is perpendicular to the front (display surface) and bottom surfaces of Smartphone 100. This 3-dimensional definition will be used in all following diagrams. For sake of definition, the azimuths are also indicated. In the prior-art, the orientation/position of Smartphone 100 is typically ascertained by Position/Orientation Transducer or Sensor 10.

FIG. 2(*c*) depicts Smartphone 100 being used as a speakerphone. In this modality, Smartphone 100 is largely oriented in portrait such that the front (display) surface of Smartphone 100 is placed approximately perpendicular to the front of the user's face, or equivalently, the bottom surface is in parallel to the mouth. In this case, Left Bottom Microphone 102*a* and Right Bottom Microphone 102*b* are placed close to and directed to the user's mouth. FIG. 2(*d*) indicates the same 3-dimensional spatial orientation accordingly.

Consider now the first embodiment of the invention whose general intention is to obtain high signal-to-noise-ratio signals (user's voice) in quite and noisy environments.

FIG. 3(*a*) depicts the first embodiment of the invention where Smartphone 100 further comprises at least one transducer or sensor, Transducer or Sensor 1*z*— in FIG. 3, an array of three transducers or sensors are depicted for sake of illustration. The 3-dimensional orientation of Smartphone 100 is referenced to FIG. 3(*b*). The sensor is generally a non-acoustical sensor, e.g., an accelerometer, shock sensor, gyroscope, vibration microphone, or vibration sensor that is arranged to sense acoustical or free-field sounds.

Consider three cases for the device embodying the invented transducer apparatus—for the first, second and third cases embodying one, two and three transducer(s) or sensor(s), respectively. The two and three transducers or sensors are respectively the first and second variations of the first embodiment of the invention.

First Case—One Transducer or Sensor where its Highest Sensitivity is in One Direction or Adjustable to any One Desired Direction In this first case, the one transducer or sensor is preferably Transducer or Sensor 1*z* in FIG. 3(*a*). This is because in the usual use of Smartphone 100 in FIG. 2(*a*), this placement or adaption of the transducer or sensor is where the one transducer is most sensitive to with respect to the user's mouth—i.e., 0° azimuth along the z-axis or perpendicular to the front (display) surface of Smartphone 100, and at bottom of Smartphone 100; also see FIGS. 4(*a*), 4(*b*) and right of FIG. 4(*c*) later. As Transducer or Sensor 1*z* is highly directional (see right of FIG. 4(*c*) or FIG. 4(*d*)later), noise from the other directions are largely unsensed, hence a high signal-to-noise signal is obtained.

This placement of the one transducer or sensor is not ideal for the use of Smartphone 100 in FIG. 2(*c*) unless the bottom of Smartphone 100 is tilted down and its top tilted upwards.

Alternatively, consider the case where the one transducer or sensor can be mechanically adjusted according to the orientation/position of Smartphone 100. When Smartphone 100 is used as in FIG. 2(*a*), that transducer or sensor is arranged to be aligned along the z-axis and directed at 0° azimuth (as Transducer or Sensor 1*z* in FIG. 3) such that that transducer or sensor is adapted such that it is most sensitive to the user's voice.

When Smartphone 100 is instead used as in FIG. 2(*c*) where the front surface of Smartphone 100 is approximately horizontal to the bottom of Smartphone 100. As the bottom of Smartphone 100 is parallel (and approximately the same height) as the user's mouth, that one transducer or sensor is arranged to be aligned along the x-axis and directed at 0° azimuth (as Transducer or Sensor 1*x* in FIG. 3) so that it is most sensitive to the user's voice.

Consider the case when Smartphone 100 in FIG. 2(*c*) is moved below the mouth of the user or tilted such that its bottom is lower than its top, e.g., approximately 45° between the x-axis (0° azimuth) and the z-axis (0° azimuth). The one transducer or sensor now arranged to be aligned also at approximately 45° between the x-axis (0° azimuth) and the z-axis (0° azimuth), i.e., between the position of Transducers or Sensors 1*x* and 1*z* in FIG. 3) such that that transducer sensor is adapted such that it most sensitive to the user's voice. This situation is somewhat similar to that if the device is a smartwatch where the smartwatch when read by the user, its front surface is usually approximately horizontal to and placed below the mouth of the user. The one transducer or sensor embodied in the smartwatch would be is arranged to be similarly aligned at approximately 45° between the x-axis (0° azimuth) and the z-axis (0° azimuth), i.e., between the position of Transducers or Sensors 1*x* and 1*z* in FIG. 3, such that that transducer or sensor is adapted such that it most sensitive to the user's voice.

First Variation: Second Case—Two Transducers or Sensors Whose the Highest Sensitivity is in Two Perpendicular Directions or Axes This case is an extension of the First Case where highest sensitivity in a second direction is augmented. In general, it would be preferable to employ two transducers or sensors in most cases over the single transducer or sensor case, i.e., using both Transducer or Sensor 1*x* and Transducer or Sensor 1*z* depicted in FIG. 3. In this case, there is no need for the transducer or sensor to be arranged to be mechanically adjusted.

When Smartphone 100 is used as in FIG. 2(*a*), Transducer or Sensor 1*z* in FIG. 3 that is arranged to be aligned along the z-axis is most sensitive to the user's voice. When Smartphone 100 is conversely used as in FIG. 2(*c*), Transducer or Sensor 1*x* in FIG. 3 is arranged such that it most sensitive to the user's voice. When Smartphone 100 in FIG. 2(*c*) is moved below the mouth of the user or tilted such that its bottom is lower than its top, both Transducers or Sensors 1*x* and 1*z* in FIG. 3 can be used—see FIGS. 5 (*a*) and 5(*b*) later where their outputs can be combined to produce a transducer apparatus that is most sensitive to the user's voice.

Second Variation: Third Case—Three Transducers or Sensors where the Highest Sensitivity is in Three Directions This case is an extension of the Second Case where highest sensitivity in a third direction is augmented. As in the Second Case, there is no need for the transducer or sensor in this Third Case to be arranged to be mechanically adjusted. The modus operandi for the use of Smartphone 100 in FIGS. 2(*a*) and 2(*c*) are that as in the Second Case. When Smartphone 100 is positioned or oriented such that either the left side or right side of Smartphone 100 is directed to the mouth of the user, Transducer or Sensor 1*y* in FIG. 3 is arranged such that it most sensitive to the user's voice.

For sake of illustration, FIG. 4(*a*) depicts an enlarged diagram of the same array of three sensors in FIG. 3(*a*). The directivity polar plot of Transducer or Sensor 1*x* is depicted on the left of FIG. 4(*c*) where Transducer or Sensor 1*x* is equally sensitive in the 0° and 180° azimuth along the x-axis. If the back of Transducer or Sensor 1*x* is blocked, e.g., by Transducer or Sensor 1*z* in FIG. 4(*a*), the sensitivity of Transducer or Sensor 1*x* in the 180° azimuth along the x-axis is reduced. This higher directivity is depicted in the left side of FIG. 4(*d*).

The same is depicted for Transducer or Sensor 1*z* is depicted on the left of FIG. 4(*c*) where Transducer 1*z* is equally sensitive in the 0° and 180° azimuth along the z-axis. If Transducer or Sensor 1*z* is placed in Smartphone 100 where the back (180° azimuth along the z-axis) of Transducer or Sensor 1*z* is blocked by the back enclosure of Smartphone 100 while the front (0° azimuth along the z-axis) of Transducer or Sensor 1*z* is exposed to free-field sounds, the sensitivity of Transducer or Sensor 1*z* in the 180° azimuth along the z-axis is reduced. This higher directivity is depicted in the right side of FIG. 4(*d*).

Note that this second variation can be extended to embody more transducers or sensors. In this case, the most sensitive direction or axis of every transducer or sensor is different from that of every other transducer or sensor.

Third Variation

The third variation of the first embodiment of the invention is where instead of a single transducer or sensor in the first embodiment, and first variation and second variations of the first embodiment of the invention, two transducers or sensors are used in the respective direction or axis of highest sensitivity. In other words, two transducers or sensors (instead of one transducer or sensor) are arranged to be placed in parallel in any given direction. This is to facilitate higher directivity by means of signal processing, e.g., beamforming. For example, in the First Case above, a further transducer or sensor is placed in parallel to Transducer or Sensor 1*z*, i.e., there are now two parallel Transducers or Sensors 1*z*.

The selection of the specific transducer or sensor in the invented transducer apparatus can be ascertained in several ways. In the above delineation of the first embodiment and its three variations, it was mentioned that the position or orientation of Smartphone 100 can be ascertained by Position/Orientation Transducer or Sensor 10, typically a 3—or more axes gyroscope in Smartphone 100 in FIG. 1 and FIG. 3.

The selection of the specific transducer or sensor in the invented transducer apparatus can also be ascertained by signal processing. In FIG. 5(*a*), the outputs of the same invented transducer apparatus embodying three transducers or sensors in FIGS. 3(*a*) and 4(*a*), the outputs of Transducers or Sensors 1*x*, 1*y* and 1*z* are now connected to Signal Processor 20, respectively by Interconnects 2*x*, 2*y* and 2*z*. Signal Processor 20 processes the outputs of Transducers or Sensors 1*x*, 1*y* and 1*z* for two purposes. One, Signal Processor 20 can ascertain the specific or combination of transducer(s) or sensor(s) that senses the user's voice and the specific or combination of transducer(s) or sensor(s) that senses mostly noise. In other words, this ascertainment is an alternative to Position/Orientation Transducer or Sensor 10.

Two, the signal processing of the outputs of Transducers or Sensors 1*x*, 1*y* and 1*z* by Signal Processor 20 can also be used to both reduce the noise (hence improved signal-to-noise ratio) because signal and noise are more readily identified. This improves the directivity of the transducers or sensors.

In Smartphone 100 that already embodies a multiplicity of microphones, can embody the invented transducer apparatus embodying one or a multiplicity of transducer(s) or sensor(s). For example, in FIG. 5(*b*), Microphones 3*x*, 3*y* and 3*z* and invented apparatus comprising Transducers or Sensors 1*x*, 1*y* and 1*z* are connected to Signal Processor 20 in Smartphone 100. This multiplicity of microphones and transducers or sensors can provide further meaningful signals to Signal Processor 20 which can in turn process noisy signals to obtain even higher signal-to-noise signals.

Consider now the second embodiment of the invention comprising a transducer apparatus whose general intention is—as in the first embodiment of the invention—to obtain high signal-to-noise-ratio signals (user's voice) in quiet and noisy environments. The same transducer or sensor is applied—generally a non-acoustical sensor, e.g., an accelerometer, shock sensor, gyroscope, vibration microphone, or vibration sensor. However, unlike the first embodiment where the transducer or sensor was adapted to sense acousutical or free-field sounds, the second embodiment embodies at least one transducer or sensor adapted to sense vibrations, movement or acceleration on the skin of the user. In variations of the second embodiment, the invented transducer apparatus further comprises a microphone or a multiplicity of microphones.

FIG. 6(*a*) depicts the directivity polar response of prior-art directional and/or close-talking microphones either obtained acoustically in a multi-port microphone or by signal processing the outputs of a multiplicity of microphones. FIG. 6(*b*) depicts the magnitude frequency response of a prior-art directional and/or close-talking microphone. Such prior-art microphones feature noise-immunity largely from two means. First is from the high-directivity polar response (from pressure gradient) as depicted in FIG. 6(*a*). Second is the high sensitivity (flat magnitude frequency response shown as the bold line plot) of near-field sounds throughout the speech spectrum, and the low sensitivity (high-pass filtered magnitude frequency response) of far-field sounds (both at 0° azimuth (pointing to the mouth of the user) and 180° azimuth (pointed away from the mouth)) in the low frequency range.

FIG. 7(*a*), redrawn from FIG. 2(*a*) earlier, depicts how the smartphone is typically used on the right side of the user's face. In a noisy environment, the user of Smartphone 100 usually increases the acoustical output of the loudspeaker in the Earspeaker Cavity 101 and typically pushes the smartphone against his Pinna 150*p* such that the Earspeaker 101*c* is placed over his Ear Canal 150*e*. FIG. 7(*b*) depicts the left side of the same user's face in FIG. 7(*a*).

With the user's action of pushing Smartphone 100 against Pinna 105*p*, Pinna 105*p* is sandwiched between screen (front surface) of Smartphone 100 and his Mastoid 150*m*. The screen (front surface) of Smartphone 100 also touches the face, typically his Cheek Area 105*c*. This action will lead to the second embodiment of the invention—see later. In this same placement, the microphones of Smartphone 100—Microphone 102*a* and Microphone 102*b*—are physically closer to the mouth of the user.

FIG. 1 earlier depicted the prior-art transducer apparatus of Smartphone 100 further comprises non-acoustical Position/Orientation Transducer or Sensor 10 which is typically a 3—or more axes gyroscope, or/and an accelerometer, shock sensor, vibration microphone, or vibration sensor. In this prior-art application, it serves to sense the movement or direction of Smartphone 100. For example, the orientation of Smartphone 100 in FIGS. 2(*a*) and 2(*b*) can be sensed by non-acoustical Position/Orientation Transducer or Sensor 10 and the display of Smartphone 100 may be oriented accordingly between portrait and landscape. Note that in all prior-art smartphone applications, this non-acoustical sensor is used to sense movement/position/orientation and not used for sensing acoustics or free-field sounds or vibrations.

FIG. 8(*a*) depicts the functional diagram of a prior-art transducer apparatus in Smartphone 100, comprising at least a single microphone, Microphone 101 (sensing free-field Acoustic Signals 201), and non-acoustical Position/Orientation Transducer or Sensor 1 (sensing Movement/Orientation 202). The outputs of Microphone 101 and non-acoustical Position/Orientation Transducer or Sensor 10 are connected to Signal Processor 20 in Smartphone 100. Microphone 101 may be a prior-art omnidirectional, directional or a prior-art close-talking microphone.

FIG. 8(*b*) depicts the functional diagram of another prior-art transducer apparatus in Smartphone 100 comprising a multiplicity of acoustical microphones and non-acoustical Position/Orientation Transducer or Sensor 10 (sensing Movement/Orientation 202). The multiplicity of acoustical microphones includes Microphone 101 (sensing free-field Acoustic Signals 201), Microphone 101*a* (sensing free-field Acoustic Signals 201*a*), Microphone 101*b* (sensing free-field Acoustic Signals 201*b*) and Microphone 101*c* (sensing free-field Acoustic Signals 201*c*). These microphones may be a prior-art omnidirectional, directional or a prior-art close-talking microphone, and may be arranged as a prior-art array of microphones.

In prior-art FIGS. 8(*a*) and 8(*b*), non-acoustical Position/Orientation Transducer or Sensor 10 is used to sense movement/orientation of Smartphone 100 and not used for sensing acoustics or free-field sounds or vibrations on the skin of the user.

Figure 9:
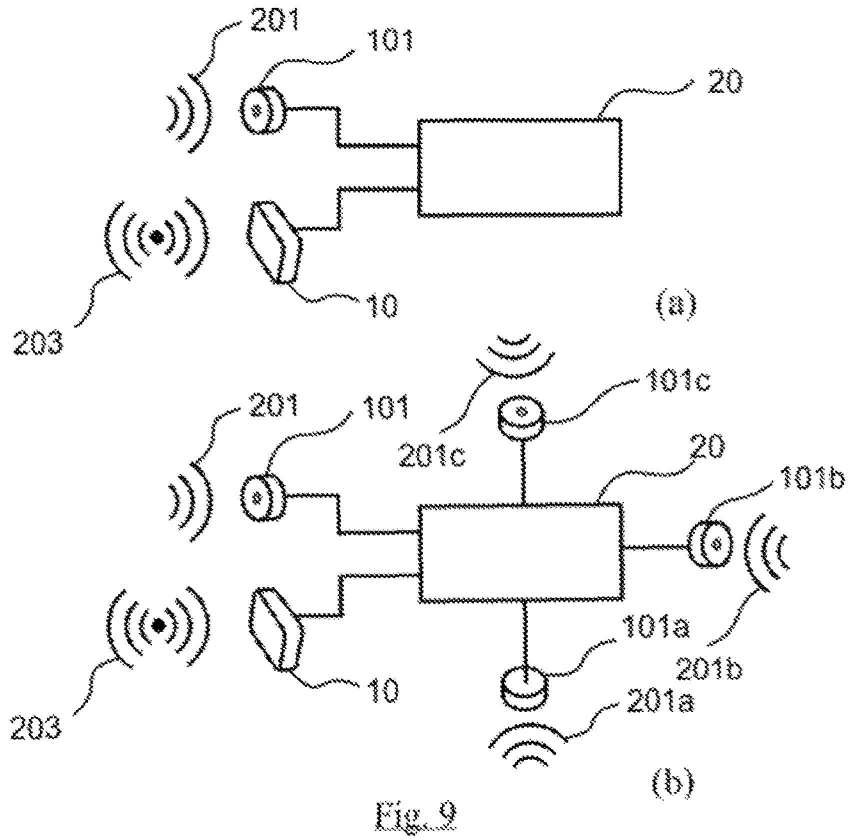
FIG. 9(*a*) depicts the functional diagram of the second embodiment of the invented transducer apparatus in a device, comprising at least a single microphone and a non-acoustical transducer or sensor that is adapted to sense vibrations, movement or acceleration on the face of the user of the device. The outputs of the single microphone and non-acoustical transducer or sensor are connected to a signal processor in the device.

In the second embodiment of the invention depicted in FIG. 9(*a*), Non-acoustical Sensor 10 is arranged to be placed on the skin of the user's head, usually Pinna 105*p* or the Cheek Area 105*c* in FIG. 7. Non-acoustical Sensor 10 is adapted to sense Vibrations 203, or movement or acceleration on the skin and not used for sensing acoustics or free-field sounds or vibrations. Vibrations 203, or movement or acceleration arise from the user's voice, and can be intense when the user presses Smartphone 100 onto his Pinna 150*p* or Cheek Area 150*c* (FIG. 7) as described earlier in a noisy environment.

The frequency response of non-acoustical Position/Orientation Transducer or Sensor 10 can be of different characteristics. In the example depicted in FIG. 10(*a*), the magnitude frequency response of non-acoustical Position/Orientation Transducer or Sensor 10 (shown as bold line plot) adapted to sense vibrations, movement or acceleration on the skin of the user is lowpass, i.e., it is more sensitive in the low frequency range than the high frequency range.

In the first variation of the second embodiment of the invention, the invented transducer apparatus further comprises at least a microphone, Microphone 101 in FIG. 9(*a*) that senses free-field Acoustical Signals 201. The frequency response of Microphone 101 can be of different characteristics. In the example depicted in FIG. 10(*b*), the magnitude frequency response of Microphone 101 (shown as long-dotted line plot) is highpass, i.e., it is more sensitive in the high frequency range than the low frequency range. The different characteristics can also include a prior-art close-talking microphone, highly directive microphone, etc.

Figure 10:
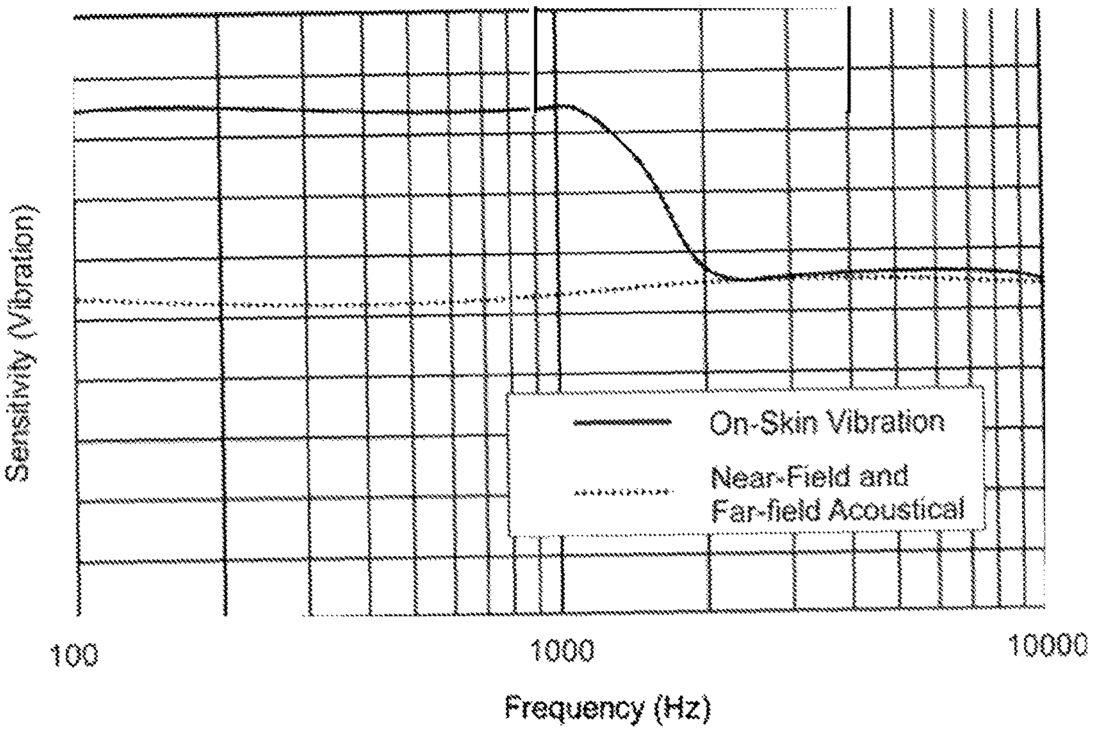
FIG. 10(*a*) depicts the magnitude frequency response of the second embodiment of the invented transducer apparatus in FIG. 9(*a*), where the transducer or sensor is adapted to sense the vibrations, movement or acceleration on the skin of the user's face and insensitive to near and far free-field sounds. The frequency response of the transducer or sensor can be of various characteristics. The example depicted here is where the transducer or sensor is more sensitive in the low frequency range than in the high frequency range.

For the invented transducer apparatus embodying non-acoustical Position/Orientation Transducer or Sensor 10 and Microphone 101 having a lowpass and highpass magnitude frequency response, respectively, the magnitude frequency response of the invented transducer apparatus would resemble that of the prior-art close-talking acoustical microphone. The magnitude responses of the invention and prior-art are depicted in FIG. 10(*b*) and FIG. 6(*b*), respectively. Of particular note, the invented transducer apparatus is sensitive to very near 'free-field' sounds (i.e., vibrations, movement or acceleration on the user's face due to his voice) in the low frequency range and sensitive to near and far free-field sounds in the high frequency range. Of particular note, the noise immunity offer by the invented transducer apparatus is significantly superior to the prior-art close-talking microphone because non-acoustical Position/Orientation Transducer or Sensor 10 adapted to sense vibrations, movement or acceleration on the skin of the user is virtually insensitive to free-field sounds when it is touching the skin of the user.

Note that the magnitude frequency responses of the non-acoustical Position/Orientation Transducer or Sensor 10 and Microphone 101 can be of different characteristics, including Lowpass, Bandpass, Band Reject, Highpass, etc. These characteristics may be adaptive. For example, when the signal-to-noise ratio of the signal is ascertained to be high, the magnitude frequency response of the at least one microphone is approximately flat, and when the signal-to-noise ratio of the signal processed by the signal processor is ascertained to be low, the output of the microphone is adapted such that its magnitude frequency range in one frequency range is attenuated.

In general, it is desirable that the composite magnitude frequency responses of the non-acoustical Position/Orientation Transducer or Sensor 10 and Microphone 101 is flat. This Composite Response (dash-dot plot) is depicted in FIG. 10(*c*) where the composite magnitude frequency response comprises the sum of the On-Skin Vibration response (continuous bold plot) and the Near and Far-field Filtered Acoustical response (Microphone; bold dotted plot).

The first variation of the second embodiment of the invented transducer apparatus depicted in FIG. 9(*a*) can be easily extended to embody more than one acoustical microphone as depicted in FIG. 9(*b*). In this FIG. 9(*b*), non-acoustical Position/Orientation Transducer or Sensor 10 is, as in FIG. 9(*a*), adapted to be placed on the skin of the user's head, usually Pinna 105*p* or the Cheek Area 105*c* to sense Vibrations 203, or movement or acceleration on the skin, is not used for sensing acoustics or free-field sounds or vibrations. Microphones 101, 101*a*, 101*b* and 101*c* are placed at different parts of Smartphone 100 to sense different free-field Acoustic Signals 210, 201*a*, 210*b* and 201*c*, respectively. The output of non-acoustical Position/Orientation Transducer or Sensor 10 and Microphones 101, 101*a*, 101*b* and 101*c* are connected to Speech Processor 20 which can execute various signal processing algorithms to further reduce the noise. For example, if the user's voice is mainly sensed by non-acoustical Position/Orientation Transducer or Sensor 10 and Microphone 101, the outputs from Microphones 101*a*, 101*b* and 101*c* can be used to suppress noise.

The second variation of the second embodiment of the invention involves the different signal processing functions performed by Signal Processor 20 in FIG. 9(*a*) and FIG. 9(*b*) and by exploiting the unique output of non-acoustical Position/Orientation Transducer or Sensor 10 adapted to be placed on the skin of the user's head to sense Vibrations 203 arising from the user's voice.

Consider two signal processing functions. One, as the sensing of the very near 'free-field' acoustics by non-acoustical Position/Orientation Transducer or Sensor 10 is highly insensitive to noise, the output of the non-acoustical Position/Orientation Transducer or Sensor 10 can be easily adapted to provide a voice activation (VOX) function. This VOX function can provide for perceived higher signal-to-noise-ratio communications.

Consider the following application of the second variation of the second embodiment invention involving communications between a transmitting smartphone (Smartphone 100) in a noisy environment at one end and a receiving smartphone on the other end. The transmitting smartphone (Smartphone 100) transmits a signal resembling the composite signal comprising the signals from non-acoustical Position/Orientation Transducer or Sensor 10 and at least one microphone when Speech Processor 20 in Smartphone 100 uses the output from non-acoustical Position/Orientation Transducer or Sensor 10 in FIG. 9(*a*) or 9(*b*) to detect speech from the user. When Speech Processor 20 in Smartphone 100 does not detect voiced speech, the transmission ceases. This communications modality is similar to the 'Squelch' function in present-day 2-way radios, and can provide a psycho-acoustical perception of higher signal-to-noise-ratio.

Two, instead of a VOX functionality, Signal Processor 20 now computes an inverted automatic gain control-type (AGC-type) function. This AGC-type function is different from prior-art AGCs where the gain of prior-art AGCs is reduced with increased signal amplitude. Instead, in the invented AGC-type function, the gain is arranged to be made dependent on the signal magnitude within the voiced speech spectrum (e.g., 70 Hz-400 Hz) sensed by Non-acoustical Sensor 1. In this computation, when voiced signal is not sensed, the gain of the AGC is arranged to be low.

Consider the same earlier communications between a transmitting smartphone (Smartphone 100) in a noisy environment at one end and a receiving smartphone on the other end. The transmitting smartphone (Smartphone 100) transmits a signal resembling the composite signal comprising the signals from non-acoustical Position/Orientation Transducer or Sensor 10 and at least one microphone when Speech Processor 20 in Smartphone 100 detects voiced speech from non-acoustical Position/Orientation Transducer or Sensor 10 in FIG. 9(*a*) or 9(*b*). When Speech Processor 20 in Smartphone 100 does not detect voiced speech, the gain in the AGC in Speech Processor 20 is reduced. The transmitting smartphone (Smartphone 100) will now transmit low-amplitude signals, i.e., low level noise. In this sense, when compared to prior-art AGCs, the inverted AGC function behaves like an intelligent reverse AGC of prior-art AGCs. In this fashion, psycho-acoustically, the listener listening the output of the receiving smartphone will perceive higher signal-to-noise signals from the transmitting smartphone.

Figure 11:
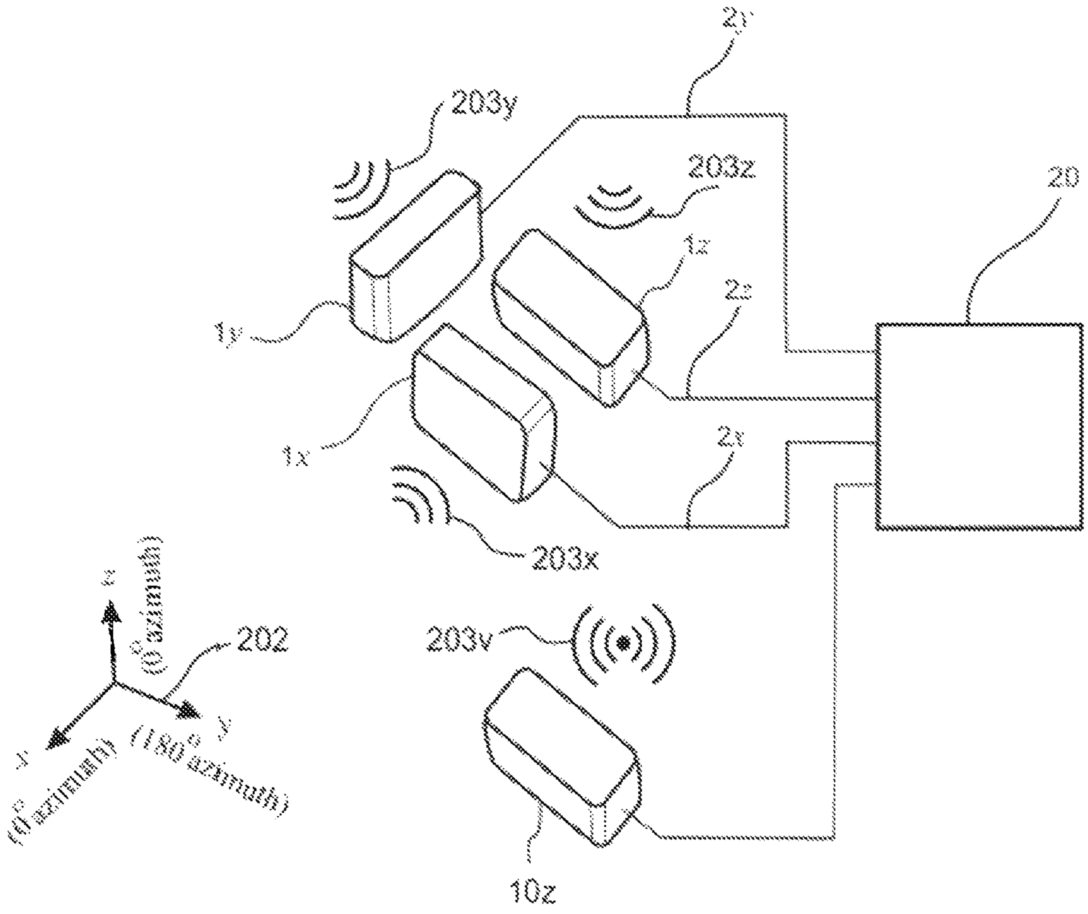
FIG. 11 depicts the third embodiment of the invention—a combination of the first and second embodiments of the invention. Here, one transducer or sensor serves as that in FIG. 9(*a*) is adapted to sense the vibrations, movement or acceleration on the skin of the user's face, and the other three transducers or sensors serve as that in FIG. 5(*a*) are adapted to sense free-field sounds in three axes of space.

Consider now the third embodiment of the invention—a combination of the first and second embodiments of the invention—and depicted in FIG. 11. In FIG. 11, non-acoustical Position/Orientation Transducer or Sensor 10*z*—similar to the second embodiment of the invention—is adapted to be placed on the skin of the user's head, usually Pinna 105*p* or the Cheek Area 105*c* in FIG. 7(*a*). This is to sense Vibrations 203*v*, or movement or acceleration on the skin arising from the user's voice.

Non-acoustical Transducers or Sensors 1*x*, 1*y* and 1*z*, on the other hand, are adapted to sense free-field Acoustic Signals 203*x*, 203*y* and 203*z*, respectively—similar to that in the first embodiment of the invention. The outputs of non-acoustical non-acoustical Position/Orientation Transducer or Sensor 10 and Transducers or Sensors 1*x*, 1*y* and 1*z*, are input to Signal Processor 20 which in turn computes signal processing algorithms using these outputs.

This third embodiment of the invention provides very high signal-to-noise-ratio signals (the voice of the user) because Position/Orientation Transducer or Sensor 10, is highly immune to free-field acoustical sounds when placed on the skin of the user, and Transducers or Sensors 1*x*, 1*y* and 1*z* are very directive in their respective three axis. Because of their highly directive attributes, the signal and the noise can be easily identified and noise can be very effectively eliminated in signal processing algorithms.

The aforesaid descriptions are merely illustrative of the principles of this invention and many configurations, variations, and various modifications can be made by those skilled in the art without departing from the scope and spirit of the invention. The foresaid embodiments may be designed, realized and implemented individually or in any combination or permutations.

REFERENCES

[1] Leo Beranek and Tim Mellow, "Acoustics: Sound Fields, Transducers and Vibration", Academic Press (2019), ISBN-13: 978-0128152270

[2] Knowles Electronics NR Series Microphones: https://www.knowles.com/docs/default-source/default-document-library/an-18-issue00.pdf?sfvrsn=6

The invention claimed is:

1. A transducer apparatus embedded in a device and comprising at least one transducer or sensor that senses vibrations, movement, or acceleration, where the at least one transducer or sensor is adapted to sense acoustical sounds, wherein the acoustical sounds comprise free-field acoustical sounds, and wherein the acoustical sounds comprise sounds arising from the voice of a user, and depending on the orientation or position of the device, the transducer or sensor is adapted to be most sensitive to one direction or along one axis.

2. A transducer apparatus according to claim 1, where the direction is to the mouth of the user of the device.

3. A transducer apparatus according to claim 1 further comprising another transducer or sensor, where the another transducer or sensor is adapted to be most sensitive to one direction or along one axis, and the at least one transducer or sensor and/or another transducer or sensor are arranged such that the most sensitive direction or axis of the one transducer or sensor is perpendicular to that of the most sensitive direction or axis of the another transducer or sensor, or in parallel to the most sensitive direction or axis of the another transducer or sensor.

4. A transducer apparatus according to claim 1, where the at least one transducer or sensor also senses the orientation or position of the device, or the transducer apparatus further comprises another transducer or sensor that senses the orientation or position of the device.

5. A transducer apparatus according to claim 3 further comprises a third transducer or sensor or more transducers or sensors, where in the case of three transducers or sensors, all transducers or sensors are arranged such that the most sensitive direction or axis of every transducer or sensor is perpendicular to the other two transducers or sensors, and in the case of more than three transducers or sensors, the most sensitive direction or axis of every transducer or sensor is different from that of every other transducer or sensor.

6. A transducer apparatus according to claim 3, where the device having a front or display surface, back surface, top surface, and bottom surface, the most sensitive direction or axis of the one transducer or sensor is perpendicular to the front or display and back surfaces, and the most sensitive direction or axis of the another transducer or sensor is perpendicular to the top and bottom surfaces.

7. A transducer apparatus according to claim 1, where the device having a front or display surface and a bottom surface, and the most sensitive direction or axis of the one transducer or sensor is approximately 135 degrees with respect to both the front or display surface and the bottom surface.

8. A transducer apparatus according to claim 1 further comprising at least one microphone and a signal processor, where the signal processor at least processes signals resembling the output of the transducer and/or the output of the one microphone.

9. A transducer apparatus according to claim 6 further comprises a signal processor, where both the one and another transducer or sensor having an output, when the device is positioned or orientated such that when its front or display surface is approximately parallel to the face of the user, at least a signal resembling the output of the one transducer or sensor is sampled by the signal processor, when the device is positioned or orientated such that when its bottom surface is approximately parallel to the face of the user, at least a signal resembling the output of the another transducer or sensor is sampled by the signal processor, and when the device is positioned or orientated any other way, at least signals resembling the output of the one transducer or sensor or/and another transducer or sensor is sampled by the signal processor.

10. A transducer apparatus according to claim 9 further comprising at least one microphone with an output, where a signal resembling the output of the microphone is sampled by the signal processor, and when the signal processor ascertains that the signal-to-noise ratio of the output of the microphone, the one transducer or sensor, or the another transducer or sensor is low, signals resembling the output of the one transducer or sensor or/and the another transducer or sensor is sampled by a speech processor.

11. A transducer apparatus embedded in a device comprising at least one transducer or sensor that is sensitive to vibrations, movement, or acceleration, where the one transducer or sensor is arranged to be mechanically coupled to the skin of the user of the device, and the one transducer or sensor is adapted to sense acoustical signals related to the user's voice from vibrations, movement, or acceleration on the skin of the user caused by the user's voice.

12. A transducer apparatus according to claim 11, where the vibrations, movement, or acceleration are sensed on the skin of the pinna, boney, non-boney, cartilaginous, non-cartilaginous or fleshy part of the head of the user of the device.

13. A transducer apparatus according to claim 11, where the one transducer or sensor is more sensitive to the vibrations, movement, or acceleration on the skin than to free-field vibrations, sounds, movement, or acceleration, or/and in one frequency range than another frequency range.

14. A transducer apparatus according to claim 11 further comprises at least one or more microphones.

15. A transducer apparatus according to claim 14, where the at least one microphone is adapted to more sensitivity in one frequency range than another frequency range.

16. A transducer apparatus according to claim 14 further comprises a signal processor, where the one transducer or sensor having an output and the at least one microphone having an output, and the signal processor samples a signal resembling the output of the one transducer or sensor and a signal resembling the output of the at least one microphone.

17. A transducer apparatus according to claim 16, where the frequency response of the at least one microphone is adapted to be variable such that when the signal-to-noise ratio of the signal processed by the signal processor is ascertained to be high, the magnitude frequency response of the at least one microphone is approximately flat, and when the signal-to-noise ratio of the signal processed by the signal processor is ascertained to be low, the output of the at least one microphone is adapted such that its magnitude frequency range in one frequency range is attenuated.

18. A transducer apparatus according to claim 11 further comprises a signal processor, where the output of the one transducer or sensor is used as a parameter for a Voice Activation algorithm in the signal processor, and/or Reverse Automatic Gain Control algorithm in the signal processor.

19. A transducer apparatus according to claim 14 where the transducer apparatus approximately resembles a close-talking microphone, where the at least one microphone is adapted to be approximately equally sensitive to near free-field and far free-field sounds in one frequency range, and adapted to be relatively insensitive to near-field and far-field sounds in another frequency range, and the one transducer is insensitive to the near and far free-field sounds, and sensitive to very near free-field sounds by means of sensing the vibrations, movement, or acceleration on the skin of the user of the device arising from the user's voice.

20. A transducer apparatus according to claim 11 further comprising a second or more transducers that are sensitive to vibrations, movement, or acceleration, where the second or more transducers are adapted to sense acoustical sounds.

* * * * *